United States Patent
Wadsworth et al.

(10) Patent No.: US 7,116,875 B2
(45) Date of Patent: Oct. 3, 2006

(54) PREFORM HOLEY OPTICAL FIBRE, A HOLEY OPTICAL FIBRE, AND A METHOD FOR THEIR PRODUCTION

(75) Inventors: William John Wadsworth, Bath (GB); Brian Joseph Mangan, Bath (GB); Timothy Adam Birks, Bath (GB); Jonathan Cave Knight, Wellow (GB); Philip St. John Russell, Bath (GB)

(73) Assignee: Crystal Fibre A/S, Birkerod (DK)

( * ) Notice: Subject to any disclaimer, the term of this patent is extended or adjusted under 35 U.S.C. 154(b) by 115 days.

(21) Appl. No.: 10/476,296

(22) PCT Filed: Apr. 30, 2002

(86) PCT No.: PCT/GB02/01965

§ 371 (c)(1),
(2), (4) Date: Mar. 29, 2004

(87) PCT Pub. No.: WO02/088802

PCT Pub. Date: Nov. 7, 2002

(65) Prior Publication Data

US 2004/0151450 A1    Aug. 5, 2004

(51) Int. Cl.
*G02B 6/02*    (2006.01)
(52) U.S. Cl. ........................... 385/123; 385/127
(58) Field of Classification Search .......... 385/123–127
See application file for complete search history.

(56) References Cited

U.S. PATENT DOCUMENTS

| | | | |
|---|---|---|---|
| 5,155,792 A | 10/1992 | Vali et al. | |
| 5,802,236 A * | 9/1998 | DiGiovanni et al. | 385/127 |
| 6,243,522 B1 * | 6/2001 | Allan et al. | 385/123 |
| 6,539,155 B1 * | 3/2003 | Broeng et al. | 385/125 |
| 6,711,918 B1 | 3/2004 | Kliner et al. | |
| 6,772,611 B1 | 8/2004 | Kliner et al. | |
| 6,882,786 B1 | 4/2005 | Kliner et al. | |
| 2004/0065118 A1 | 4/2004 | Kliner et al. | |

FOREIGN PATENT DOCUMENTS

| | | |
|---|---|---|
| EP | 0520653 A1 | 12/1992 |
| WO | WO 99/00685 | 1/1999 |
| WO | 00/006506 | 2/2000 |

(Continued)

OTHER PUBLICATIONS

Birks, T.A., et al., "Endlessly Single-Mode Photonic Crystal Fiber", Optics Letters, vol. 22, No. 13, Jul. 1, 1997, pp. 961-963.

(Continued)

*Primary Examiner*—Frank G. Font
*Assistant Examiner*—Eric Wong
(74) *Attorney, Agent, or Firm*—Buchanan Ingersoll & Rooney PC

(57) ABSTRACT

A holey optical fibre for supporting propagation of light of a wavelength λ, comprises a plurality of cylinders (10) each having a longitudinal axis, the cylinders (10) being separated from each other by regions of a matrix material (20) and having their longitudinal axes substantially parallel to each other. Each cylinder (10) has a diameter, in the plane perpendicular to the longitudinal axis, that is small enough for the composite material of the ensemble of cylinders and matrix material to be substantially optically homogenous in respect of light of wavelength λ.

61 Claims, 12 Drawing Sheets

FOREIGN PATENT DOCUMENTS

| | | |
|---|---|---|
| WO | WO 00/16141 | 3/2000 |
| WO | WO 00/37974 | 6/2000 |
| WO | WO 00/49436 | 8/2000 |
| WO | WO 01/96919 A1 | 12/2001 |

OTHER PUBLICATIONS

Birks, T. A., et al,. "Single Material Fibers for Dispersion Compensation", OFC'99, Technical Digest, 1999, pp. 108-110.

Dominic, V., et al., "110W Fibre Laser", Electronics Letters, vol. 35, No. 14, Jul. 8, 1999, pp. 1158-1160.

Knight, J.C., et al., "All-silica Single-Mode Optical Fiber with Photonic Crystal Cladding", Optics Letters, vol. 21, No. 19, pp. 1547-1549, vol. 22, No. 7, pp. 484-495.

Monro, T., et al., "New possibilities with Holey Fibers", OFC 2000, Technical Digest Postconference Edition, vol. 3, 2000, pp. 106-108.

Wadsworth, W.J., et al., "$Yb^{3+}$-doped Photonic Crystal Fibre Laser", Electronics Letters, vol. 36, No. 17, Aug. 17, 2000, pp. 1452-1454.

Copy of a Communication issued in a corresponding European patent application.

* cited by examiner

PREFORM HOLEY OPTICAL FIBRE, A HOLEY OPTICAL FIBRE, AND A METHOD FOR THEIR PRODUCTION

This invention relates to the field of optical materials.

U.S. Pat. No. 5,155,792 teaches an optical fibre having a low index of refraction. In one embodiment described in that Patent, the cladding of the fibre comprises a uniform array of tube structures each being of a diameter less than the shortest wavelength of light guided by the fibre. The core may be formed from a rod or from several rods of uniform refractive index. In another embodiment, the core of the fibre also comprises a uniform array of tube structures each being of a diameter less than the shortest wavelength of light guided by the fibre, the core having a higher refractive index than the cladding but nevertheless a uniform and low refractive index.

However, that U.S. patent does not contemplate the possibility of engineering the optical properties of a material other than by providing a uniform and low refractive index.

An object of the invention is to provide an optical material having optical properties that can readily be engineered. An object of the invention is to provide a method of engineering such properties.

According to the invention there is provided a composite material for supporting propagation of light of a wavelength $\lambda$, comprising a plurality of elongate regions, each region differing from a neighbouring region in an optical property of the material of which the region is made, and each region having a transverse cross-sectional area that is sufficiently small for the composite material to be substantially optically homogeneous in respect of light of wavelength $\lambda$.

Such an arrangement of regions is referred to below as "nanostructure", although the regions may, in some circumstances, be of dimensions and/or separations of a larger scale than nanometers.

Substantially optically homogeneous material causes no significant perturbation of the transverse optical field profile of light propagating in the composite material. Of course, whether or not the regions cause significant perturbation of the transverse optical field profile of propagating light is a question that may be determined experimentally. However, one way to quantify theoretically the effect of the regions is to calculate a modified version of the well-known V-parameter (also known as the V-value or normalised frequency). In a simple case of cylinders of cross-sectional area A and of a material of refractive index $n_{cylinder}$ embedded in regions of a matrix material of refractive index $n_{matrix}$, the modified V-value V is given by $$V^2 = \frac{4\pi A}{\lambda^2} |n_{cylinder}^2 - n_{matrix}^2| \quad (1)$$

The modified V-value gives a measure of how confined to the cylinders is the transverse optical field. If the V-value is small (less than 1, for example) then the optical field is not well confined and the cylinders will not cause a significant perturbation. Ever smaller values of V are in general preferable, for example V<0.6 or even V<0.4.

In more complicated embodiments of the invention, such as, for example, when each cylinder comprises an inner region of refractive index $n_1$ and area $A_1$, surrounded by an annular outer region of refractive index $n_2$ and area $A_2$, one may calculate a "collective V-value" $V_c$. For p regions embedded, directly or indirectly, in a matrix material, each region being of refractive index $n_p$ and area $A_p$, we define $$V_c = \sqrt{\sum_p V_p^2}, \text{ where } V_p^2 = \frac{4\pi A_p}{\lambda^2} |n_p^2 - n_{matrix}^2|. \quad (2)$$

Again, if the V-value is small, then the optical field is not well confined and the embedded regions will not cause a significant perturbation of the transverse profile of an optical field of wavelength $\lambda$.

In some circumstances, such as when a waveguide is defined in the material, another indication of the effect that the regions would have on an optical field can be obtained by evaluating a transverse component $k \sin \theta$ of the wavevector $k$ for light propagating at an angle $\theta$ to the longitudinal axis of the waveguide. That component gives an effective transverse wavelength $$\lambda_{eff} = \frac{2\pi}{k \sin \theta} \quad (3)$$

which will in general be greater than $\lambda$. The material will be substantially optically homogeneous if the largest transverse dimension of each of the regions is small compared with $\lambda_{eff}$.

The regions may comprise a dielectric material or a semiconductor. The regions may comprise a metal.

Some parts of the material may have different properties from other parts of the material.

Preferably, the regions are not all of the same refractive index.

Preferably, at least some of the regions have been doped with a dopant. Doping is a convenient way to change the optical properties of a material; stresses in the material may be much less than if two different materials are used and fused together.

Preferably, the doping results in a change in refractive index. Doping can then be used to provide a selected effective refractive index of the material and, for example, to introduce refractive-index structures into the material.

Preferably, at least some of the regions are doped with an optically active dopant.

Preferably, the optically active dopant renders the material photosensitive; examples of suitable dopants would be germanium, boron, or tin. It may be that not all of the regions are doped in the same manner, so that not all regions of the material are equally photosensitive. Such a material could be incorporated into, for example, multicore fibre.

The optically active dopant may provide optical gain; for example, the optically active dopant may comprise ytterbium or erbium. It may be that not all of the regions are doped with the same optically active dopant, so that gain is provided at two or more different wavelengths; thus "dual wavelength" operation may be provided.

Preferably, the composite material has a selected effective-refractive-index profile. Such a selected effective-refractive-index profile may be provided, for example, by altering the refractive index of a bulk material by any of the means described above.

Preferably, the material is elongate and the selected effective-refractive-index profile is a gradual decrease in refractive index radially from the centre of the material in the plane perpendicular to the elongate axis. Such a graded-index structure may be a useful waveguiding structure.

Nanostructuring according to the invention is a convenient means of introducing other effective-refractive-index profiles into the material. For example, the selected effective-refractive-index profile may define a regular polygon. Alternatively, the selected effective-refractive-index profile may define a non-regular figure.

Preferably, the selected effective-refractive-index profile defines a waveguide including a core having an effective refractive index that is larger than the effective refractive index of material surrounding the core. Preferably, the core is larger than 10 microns in its smallest transverse dimension and the difference, between the effective refractive index of the core and the effective refractive index of the material surrounding the core is sufficiently small for the waveguide to support single-mode propagation of light (for example, a 25 micron diameter core with a refractive index of 1.5 would support propagation of light of wavelength 1.5 microns in a single mode if the refractive index difference is less than 0.0007). Ever larger cores may be preferable in many applications; preferably, the core is larger than 15 microns, more preferably larger than 20 microns and still more preferably larger than 25 microns in its smallest transverse dimension.

The refractive-index profile may result in additional changes in the optical properties of the material; for example, it may define an optically dispersive material.

Birefringence will generally result if the material has no rotational symmetry higher than two-fold rotational symmetry, about any longitudinal axis along which light can propagate. Thus, the material may have two-fold rotational symmetry or no rotational symmetry about such an axis.

Preferably, the elongate regions comprise a plurality of cylinders separated from each other by regions of a matrix material.

As light propagating in the material will in general see only an average of the optical properties of the cylinders and the matrix regions, the optical properties of the material may be engineered by appropriate choice of cylinder and matrix properties and by the arrangement of the cylinders in the matrix. A wide range of properties may be introduced, for example by using cylinders comprising different materials in different parts of the material or by doping the cylinders.

Preferably, the composite material is arranged to support propagation of light in a direction substantially parallel to the longitudinal axes. Preferably, the material is arranged to guide light propagating in a direction not in the plane perpendicular to the longitudinal axis.

Preferably, the cylinders are solid. At least some of the cylinders may be holes defined by the matrix regions. The holes may be filled with a fluid; such an arrangement of holes filled with a gas, in particular a gas other than air, or a liquid may be used to provide a nonlinear material. It will be understood that the word "cylinder" refers to any three-dimensional figure of uniform cross-section, which cross-section is not necessarily circular. Preferably, the cylinders are of circular cross section.

Preferably, the diameter of the cylinders is less than 1 micron.

The refractive index of the cylinders may be less than that of the regions of a matrix material. The refractive index of the cylinders may be greater than that of the regions of a matrix material. Alterations to the refractive indices may be achieved in different ways, some of which are discussed below.

Preferably, the cylinders comprise an inner region having a first refractive index $n_{inner}$ and an outer region having a second refractive index $n_{outer}$ and surrounding the inner region so that the refractive index of the cylinder is an effective refractive index that is between the first and the second refractive indices. If the diameter of the cylinders is small compared with the wavelength of propagating light, and if the absolute variation of refractive index is small, the effective refractive index $n_{eff}^{cyl}$ will be given approximately by $$n_{eff}^{cyl} = \frac{n_{inner}A_{inner} + n_{outer}A_{outer}}{A_{inner} + A_{outer}} \quad (4)$$

where $A_{inner}$ and $A_{outer}$ are the cross-sectional areas respectively of the inner and outer regions of each cylinder. Equation (4) is an approximation given for the purpose of aiding understanding of the invention; in general, expressions for the effective refractive index are not so simple but may readily be calculated by a person skilled in the art.

The effective refractive index may be equal to the refractive index of the matrix regions. It is thus possible to use different materials in the inner region, the outer region and the matrix region, each of which materials may have different, desirable properties, but still present a uniform effective refractive index to propagating light. The cylinders may be distributed in the matrix material at different densities in different parts of the material. It may be that the regions of a matrix material are not all of the same material and/or that the cylinders are not all identical to each other; for example, it may be that the cylinders are not all of the same refractive index, shape, size and/or material. At least some of the cylinders or regions of matrix material may have been doped with a dopant. The composite material may exhibit birefringence due to mechanical stresses between the cylinders and the regions of a matrix material.

The rotational symmetry of the material may result at least partly from the distribution of the cylinders. The rotational symmetry of the material may result at least partly from the shape of the cylinders.

Preferably, the elongate regions in the material are solid. It may be that the material does not contain voids.

Also according to the invention there is provided an optical amplifier comprising a composite material as described above as being according to the invention. Preferably, the optical amplifier is a large-mode-area amplifier. Also according to the invention there is provided a laser including such an optical amplifier.

Also according to the invention there is provided a method of providing a selected optical property in a composite material for supporting propagation of light of a wavelength $\lambda$ comprising: (i) providing a plurality of rods each having a longitudinal axis; (ii) forming a bundle of the rods, in which the rods have their longitudinal axes substantially parallel to each other; (iii) drawing an elongate, fused rod from the bundle;

cutting the fused rod into a plurality of lengths; and (iv) repeating steps (ii) and (iii) at least once by forming the bundle from the lengths of fused rod and drawing a further, elongate fused rod from the bundle.

Thus, the optical properties of the composite material are fixed by arranging macroscopic objects and then drawing reduces the dimensions-of the structure until the material becomes substantially optically homogeneous. Thus a structure that is relatively more optically homogenous may be made from a structure that is relatively less optically homogenous.

Preferably, the further, elongate fused-rod produced at the end of step (iv) comprises a plurality of solid cylinders each having a longitudinal axis, the cylinders being separated from each other by regions of a matrix material and the cylinders having their longitudinal axes substantially parallel to each other, and each cylinder having a diameter, in the plane perpendicular to the longitudinal axis, that is small enough for the composite material to be substantially optically homogeneous in respect of light of wavelength $\lambda$.

More preferably, the rods used in step (i) have an inner region of a first solid material and an outer region of a second solid material and surrounding the inner region and the inner regions of those rods form the plurality of solid cylinders.

Preferably, in at least some of the rods the inner region has a first refractive index and the outer region has a second, different refractive index.

Preferably, at least two of the rods differ in an optical property. For example, the differing rods may differ in refractive index.

The rods may be doped with a dopant that is not evenly distributed across the cross-section of the rod. Such a doped rod may have a relatively even dopant distribution and may form a perfectly reasonable guiding core when drawn down into a fibre. However, it may be possible to produce a far better core, having a far more even dopant distribution, by using multiple stacking and drawing of the rods. In other words, a relatively more optically homogenous material may be created by this method than would otherwise be provided.

Any suitable combination of different types of preform element may, of course, be used.

Preferably, the bundle of rods is enclosed in a jacket in step (ii). An advantage of using a jacket is that the spaces between the canes may be evacuated to eliminate unwanted air holes that would otherwise be formed in the drawing process.

Also according to the invention there is provided a method of manufacturing an optical fibre, including the step of drawing an optical fibre from a preform comprising at least one rod manufactured by such a method. Preferably, the method includes the step of enclosing the preform in a jacket prior to drawing the fibre.

Also according to the invention there is provided an optical fibre comprising a composite material as described above as being according to the invention. Preferably, the fibre is a photonic crystal fibre. Photonic crystal fibres are also known as microstructured fibres. Such fibres typically have a cladding comprising an array of elongate holes. If the effective refractive index of the cladding is lower than that of the core then a photonic-crystal fibre generally guides light by total internal reflection. Otherwise, a photonic-crystal fibre has its elongate holes arranged in a periodic lattice that excludes light at certain frequencies, forming a photonic band-gap. The core in such a fibre acts as a defect that breaks the periodicity of the lattice and allows propagation of light at frequencies in the photonic band-gap; the light is thereby confined to the core.

Also according to the invention, there is provided a fibre amplifier comprising such a fibre. Also according to the invention, there is provided a fibre laser comprising such an amplifier.

Also according to the invention, there is provided a method of transmitting light in a composite material described above as being according to the invention.

Various embodiments of the invention will now be described, by way of example only, with reference to the accompanying drawings, of which:

The schematic figures are, of course, not drawn to scale.

Figure 1:
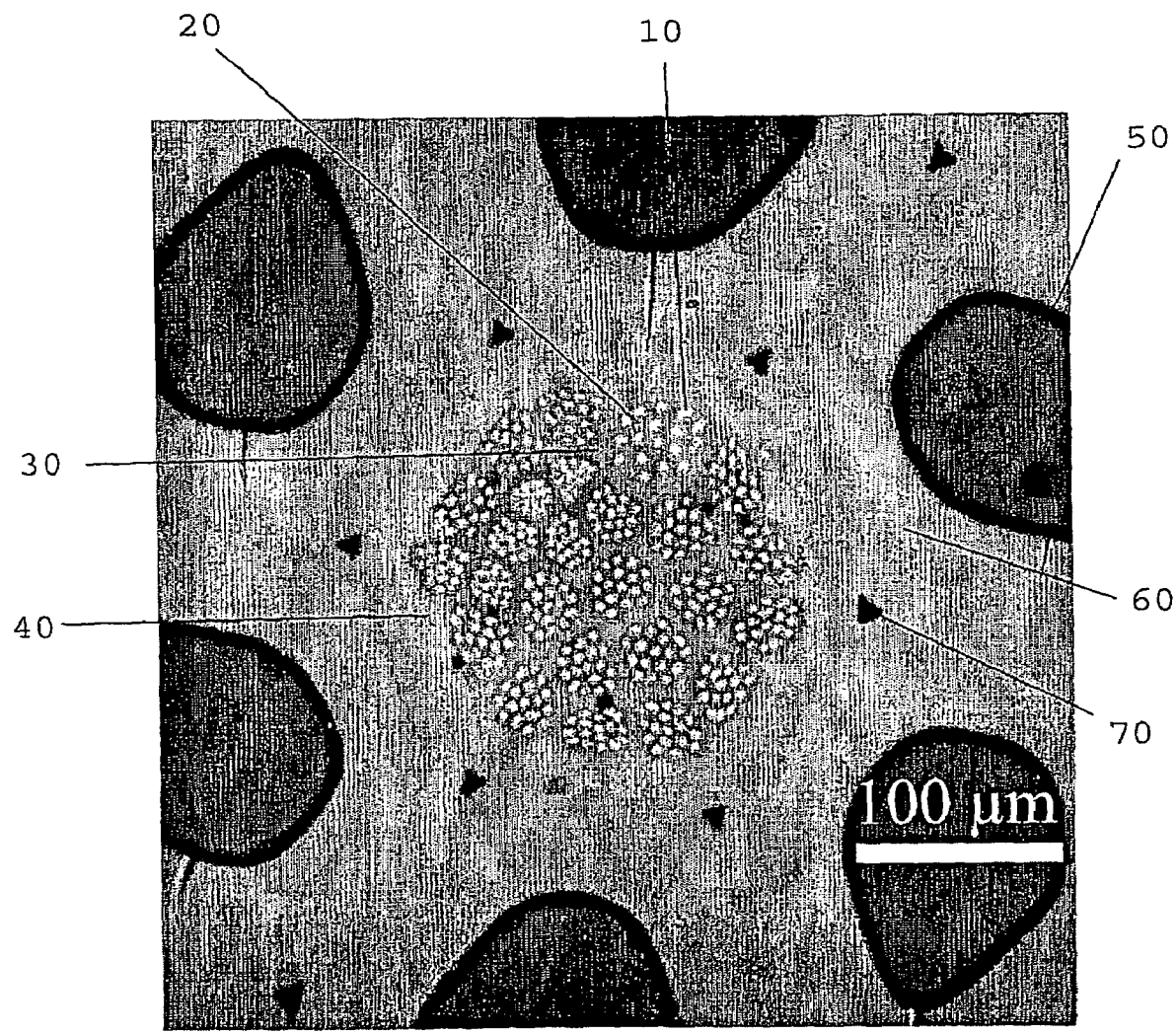
FIG. 1 is an optical micrograph of a preform produced as a step in a method according to the invention.
Figure 13:
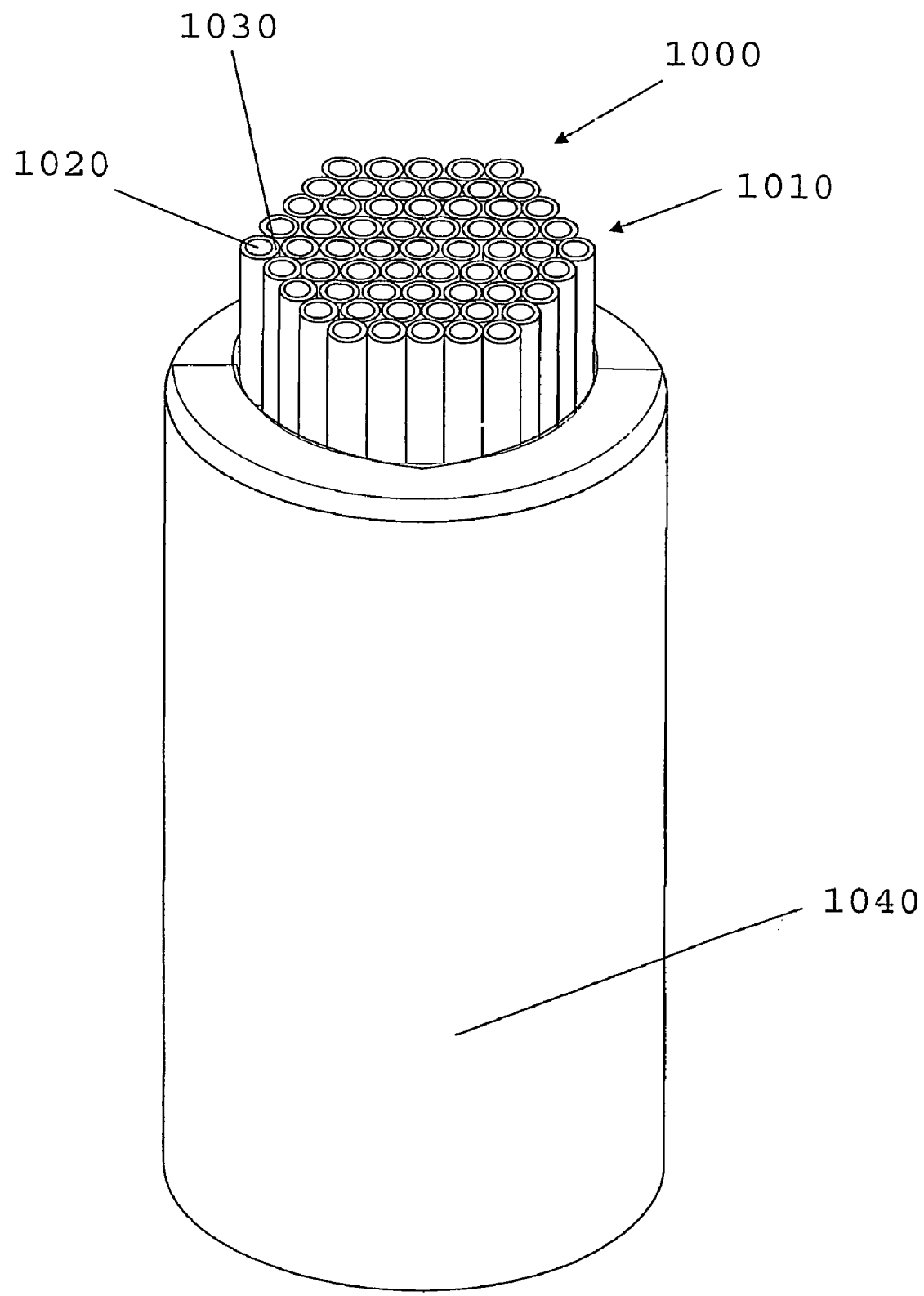
FIG. 13 is a preform for use in a multiple stack and draw method according to the invention.

In an embodiment of the invention, a bundle 1000 is formed from rods 1010 each having a core region 1020 of doped silica and a second, outer region 1030, of undoped silica, which surrounds the core region 1020 (FIG. 13). A jacket, in the form of a tube 1040 of undoped silica is placed around the bundle 1000. An elongate, fused rod is drawn from the jacketed bundle by heating it and stretching it in a manner well known in the prior art. The fused rod is cut into segments of equal length and a further bundle is formed from those lengths of fused rod. That further bundle is placed inside a jacket of undoped silica and further fused rod is similarly drawn from that further bundle. The rod resulting from three bundling steps is shown in FIG. 1. Doped regions 10 and undoped matrix regions 20 result from the doped cores and the undoped outer regions (respectively) of the rods provided initially. The jackets placed around those rods form matrix regions 30 and the jacket placed around the further rods forms region 40. The jacketed bundle has been drawn into a further rod, which has been bundled together with rods in the form of capillaries. That bundle is also jacketed and drawn. The preform elements are thoroughly cleaned before each draw-down using standard, well-known industry techniques. Elongate holes 50 result from the hollow cores of the capillaries and regions 60 result from the material of the capillary walls. Interstitial holes 70 result from the imperfect tiling of the capillary cross-sections.

Figure 2:
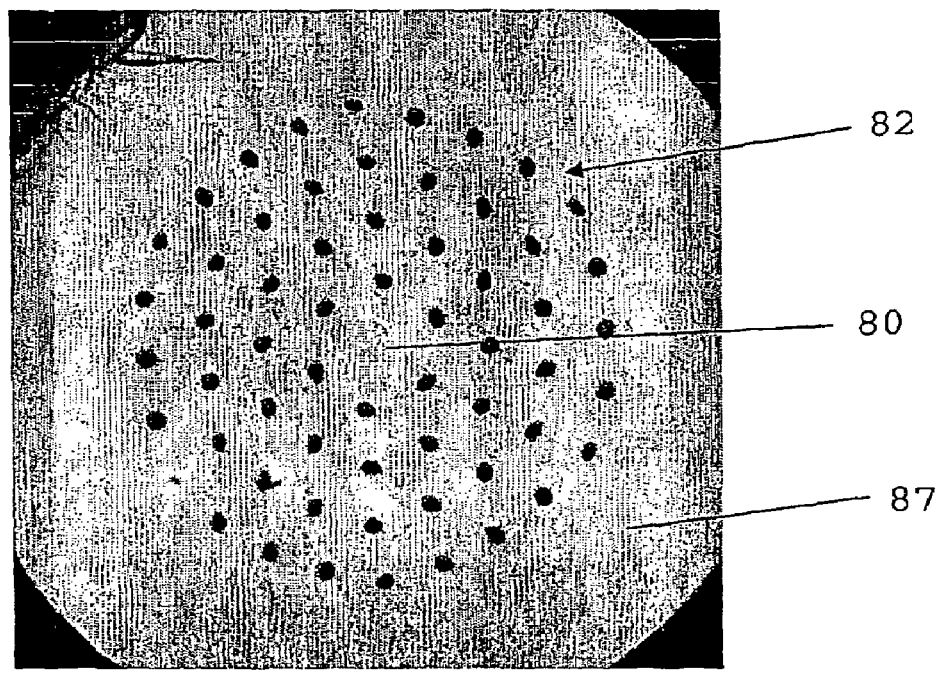
FIGS. 2 and 3 are optical micrographs of the cleaved ends of photonic-crystal fibres according to the invention drawn from the preform of FIG. 1.
Figure 3:
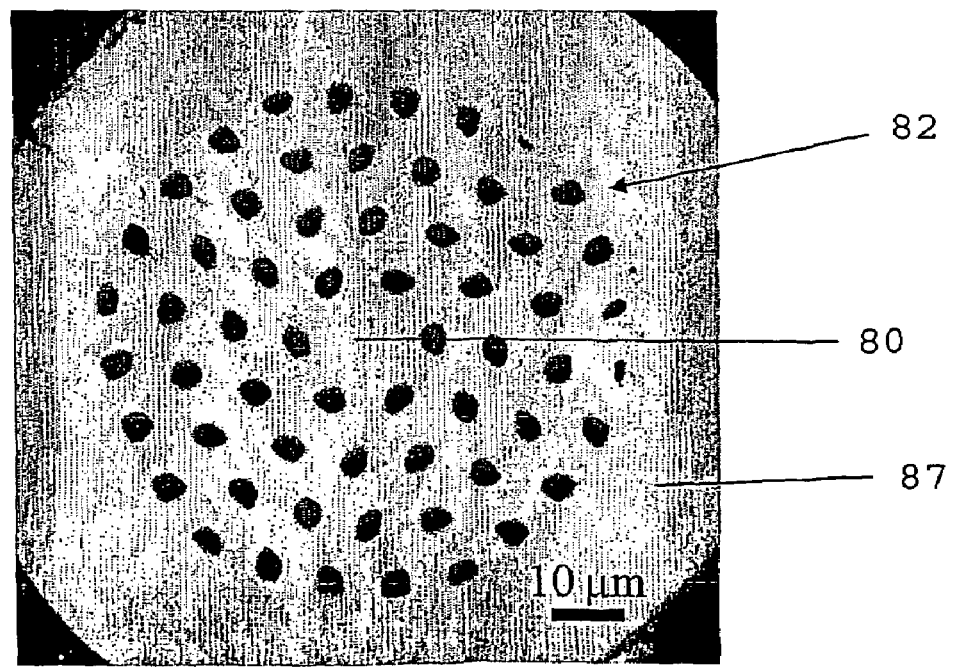

The rod of FIG. 1 is a preform for production of optical fibre. The rod is drawn, in the usual way, to produce photonic-crystal fibre of diameter 120 μm and core diameter 15 μm between the innermost air-holes. FIG. 2 shows such a fibre that has a ratio of hole diameter d to hole pitch Λ of d/Λ=0.3. FIG. 3 shows a fibre drawn from the same preform but drawn to have larger holes, with d/Λ=0.55. Different hole sizes are achieved by changing the drawing tension by controlling the temperature of the drawing furnace.

In the drawn fibres of FIG. 2 and FIG. 3, core region 80 is optically homogeneous even though it is formed from cylindrical doped regions separated by silica matrix regions (the regions in which the cylinders are embedded, invisible in FIGS. 2 and 3 but corresponding to doped regions 10 and matrix regions 20 and 30 in FIG. 1; in this embodiment, the regions of a matrix material are continuous with each other and with the silica of the photonic crystal cladding 82 and the fibre jacket 87). The effective refractive index step is approximately 0.001. Optical homogeneity result because each of the cylindrical doped regions has a diameter of less than 250 nm, which is small compared with the effective transverse wavelength of the guided mode of light that the fibre is to guide (in this case 1040 nm). The area filling fraction of the doped glass is a few percent so the resulting effective-refractive-index step is insufficient for guidance of light within the cylinders themselves to occur.

FIGS. 4 to 12 show other ways in which material structured at a scale small enough for the material to appear homogeneous to light can be used to provide fibres and other devices having interesting properties.

Figure 4:
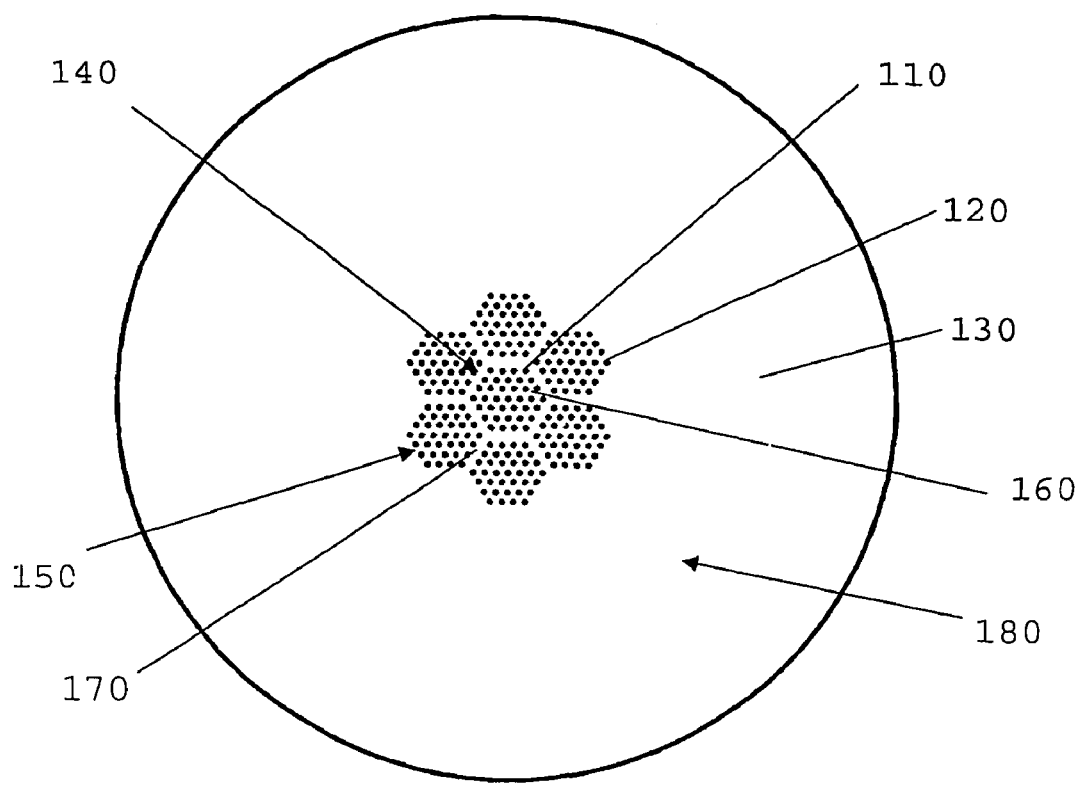
FIGS. 4 and 5 are schematic cross-sections through optical fibres incorporating in their cores an optical material according to the invention, the optical material having a graded refractive-index structure.

The single-mode optical fibre (the example illustrated is not a photonic crystal fibre) of FIG. 4 has a graded-index structure. The graded-index structure is achieved by provision of doped cylinders 110, 120 in a fibre comprising principally of bulk, undoped silica 130. Cylinders 110 are arranged to form hexagonal region 140 at the centre of the fibre cross-section. Region 140 is enclosed by six hexagonal regions 150, formed by cylinders 120. Hexagonal regions 140, 150 result from the bundling and drawing process. Cylinders 110 (and, similarly, cylinders 120) are separated by matrix material 160, which results from the undoped silica outer regions of the rods from which the material is drawn. Regions 140, 150 are separated by matrix material 170, which results from jacketing the bundles in the bundling and drawing process and, in this embodiment, is also formed of undoped silica. Regions 140, 150 are themselves surrounded by a thick cladding region 180, which is formed by repeated jacketing of a bundle comprising the preforms for regions 140, 150.

Cylinders 110 are formed of silica doped with germanium ions. Such doped silica has a refractive index that is higher than that of bulk silica. The separation of the cylinders 110 is small compared with the wavelength of light that the fibre is to be used to guide and so the effective refractive index seen by the light is an average of the refractive index $n_{cynlinder}$ of the doped silica and the refractive index $n_{matrix}$ of the undoped matrix regions between cylinders 110. The diameter of the cylinders is small compared with the wavelength of propagating light, and the absolute variation of refractive index is small, so the effective refractive index $n_{eff}$ of region 130 is given approximately by:

$$n_{eff} = \frac{n_{cylinder} A_{cylinder} + n_{matrix} A_{matrix}}{A_{cylinder} + A_{matrix}} \quad (5)$$

where $A_{cylinder}$ and $A_{matrix}$ are the areas taken up by cylinders and matrix regions in region 140.

Cylinders 120 are formed of silica that is less heavily doped. Each of those cylinders 120 thus has a refractive index that is higher than that of bulk silica but lower than that of the doped silica in cylinders 110. The effective refractive index of region 150 is thus higher than that of cladding 180 but lower than that of region 140.

The refractive index seen by light propagating in the fibre thus decreases from the centre of the fibre radially outwards. Light is guided by total internal reflection but the interface between the core region 110 and the cladding 180 of the fibre is distributed over a portion of the fibre diameter rather than being a single, abrupt step. Thus the fibre acts as a graded-index fibre. The profile of the refractive-index variation may readily be adjusted in different fibres by adjusting the dopant concentrations at different sites.

Figure 5:
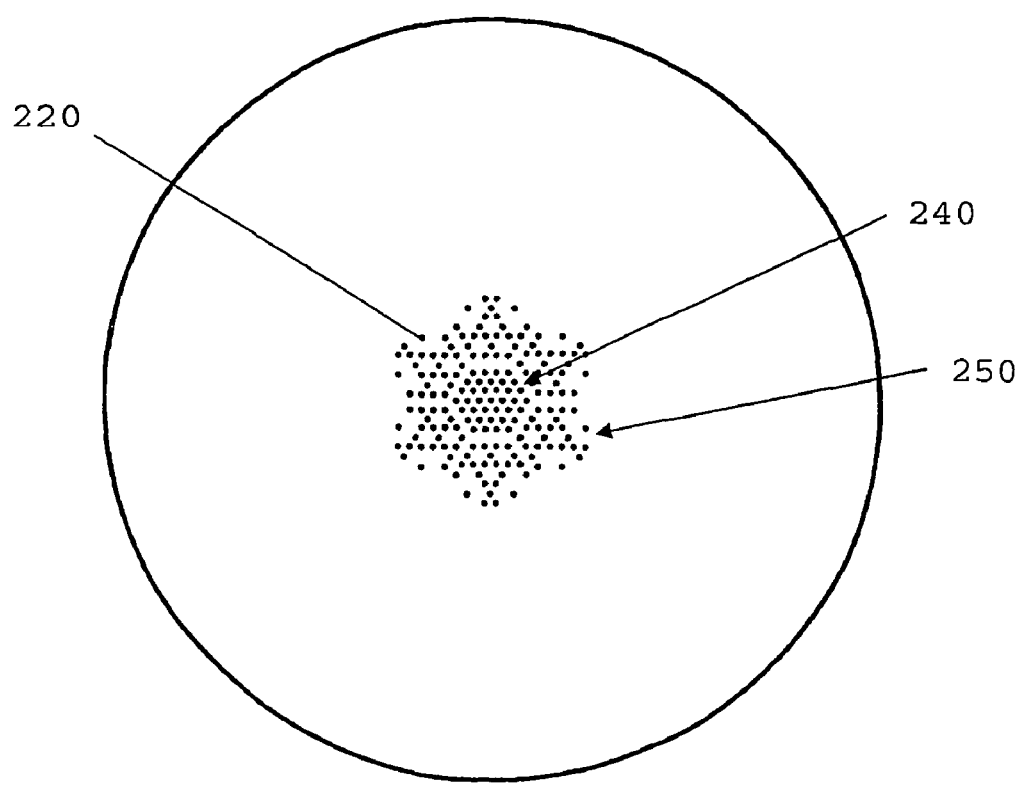

The fibre of FIG. 5 embodies another approach to providing a graded-index fibre by providing nanostructure. Central region 240 corresponds to region 140 in FIG. 4. However, regions 250 are formed from bundles in which rods doped to the same concentration as the rods forming region 240 are interspersed with undoped rods. That arrangement of rods results in regions 250 having a lower effective refractive index than region 240 and, furthermore, cylinders 220, which result from the doped rods, are themselves arranged in region 250 to be concentrated more to the centre of the fibre so that the effective refractive index of regions 250 themselves decreases radially outward.

Figure 6:
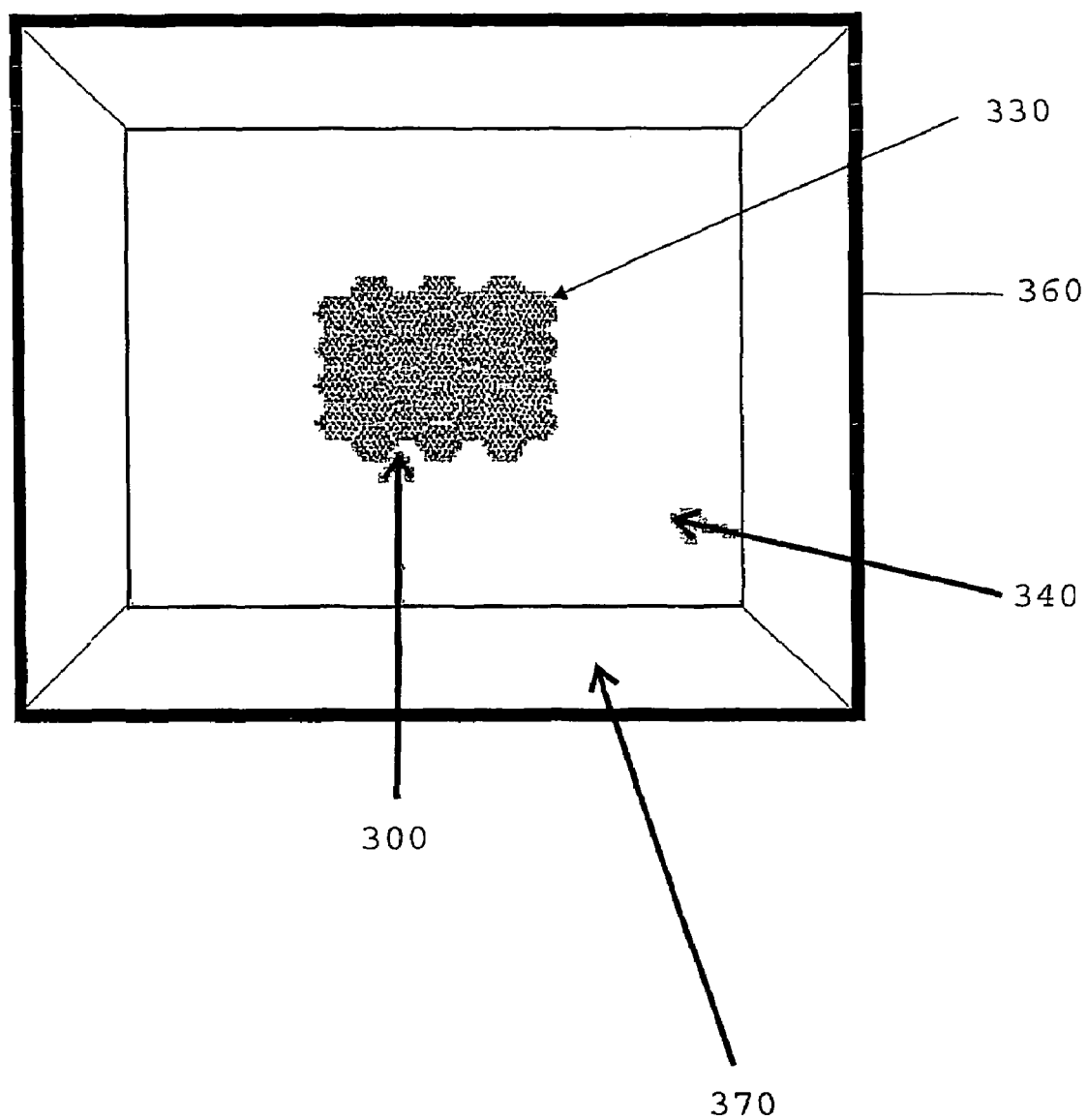
FIG. 6 is a schematic cross-section through a single-mode waveguide laser or amplifier, which has a very large core incorporating an optical material according to the invention.

The single-mode waveguide laser of FIG. 6 has a very large core 300 formed by use of nanostructured material to create a very small but uniform refractive-index contrast. Core 300 comprises an approximately rectangular arrangement of hexagonal regions 330, which each contain cylinders, which are made of doped silica, separated by undoped silica matrix regions.

Core 300 is embedded in an inner cladding 340 (which is made of bulk, undoped silica) to facilitate cladding pumping. Inner cladding 340 is supported in a glass tube 360 so that an outer cladding region of air 370 results that surrounds inner cladding 340 within tube 360.

The cylinders forming regions 330 are of two types. Those of the first type, of refractive index $n_{cynlinder}^{Er}$, are doped with Erbium ions to provide a gain medium (they are also co-doped with aluminium to improve erbium ion solubility). Those of the second type, of refractive index $n_{cylinder}^{Ge}$, are doped with germanium to control the effective refractive index of core 300. The diameter of the cylinders is small compared with the wavelength of propagating light, and the absolute variation of refractive index is small, so the effective refractive index of the core 300 is given approximately by:

$$n_{eff} = \frac{n_{matrix} A_{matrix} + n_{cylinder}^{Ge} A_{cylinder}^{Ge} + n_{cylinder}^{Er} A_{cylinder}^{Er}}{A_{matrix} + A_{cylinder}^{Ge} + A_{Cylinder}^{Er}} \quad (6)$$

where $A_{matrix}$, $A_{cylinder}^{Ge}$ and $A_{cylinder}^{Er}$ are the areas taken up by the matrix regions, germanium-doped cylinders and Erbium-doped cylinders in the cross-section of core 300.

The cylinders of several different materials are repeatedly mixed during bundling and drawing to increase the uniformity.

The effective refractive index of the core 300 is controlled so that the difference in refractive index between the core 300 and the inner cladding 340 is sufficiently small for the waveguide to guide light propagating in a large single mode. The condition for single-mode operation is well-known: the normalised frequency V must be less than 2.405, where in this case $$V^2 = \frac{4\pi A}{\lambda^2}(n_{eff}^2 - n_{cladding}^2) \qquad (7)$$

where A is the area of the core and $n_{cladding}$ is the refractive index of the cladding.

It is interesting to note that, if the same amount of doped glass were to be contained within a single doped region, then the guided mode of the fibre would be very strongly peaked in the doped region. In order to obtain a large mode area, a single doped region would have to be much smaller and hence would contain fewer dopant ions, reducing the absorption and gain.

Figure 7:
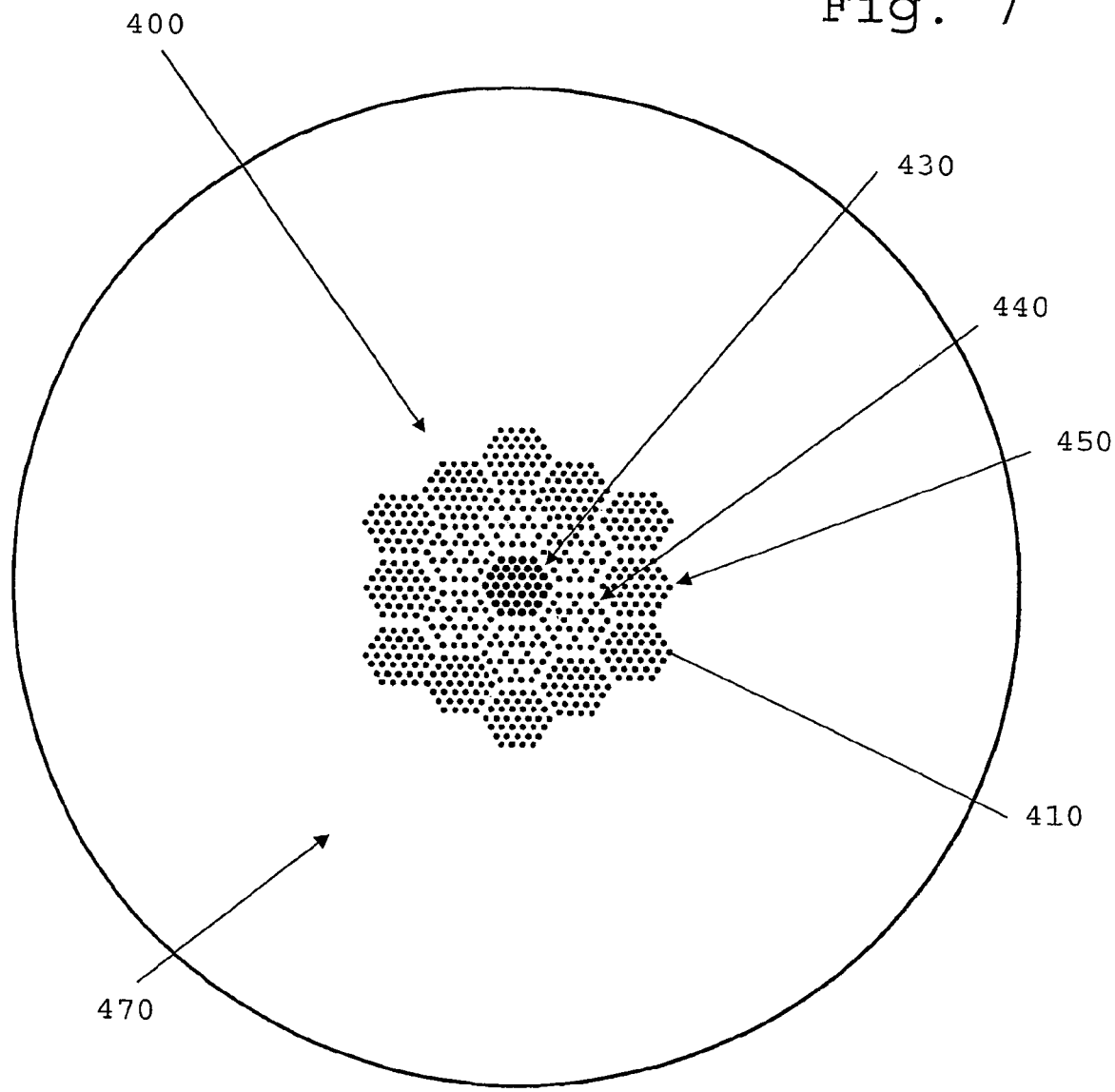
FIG. 7 is a schematic cross-section through a single-mode optical fibre having unusual dispersion properties resulting from use of a core incorporating an optical material according to the invention.

The single-mode optical fibre of FIG. 7 has an unusual dispersion characteristic, which is similar to that of known W-index fibres. The fibre consists of a core 400 surrounded by a cladding 470. The core 400 contains hexagonal regions 430, 440, 450, each containing cylinders 410 of silica doped with germanium, separated by matrix regions of undoped silica. Region 430 is drawn from bundled doped rods. Region 450 is also drawn from bundled doped rods but the concentration of dopant in the doped cores is lower than for region 430. Region 440 is drawn from a bundle containing rods such as those from which region 450 is drawn but, in region 440, the doped rods are interspersed with undoped silica rods. The effective refractive index of the core thus decreases radially outwards from a maximum in region 430, through a local minimum in region 440, increases to a higher figure in region 450 (but not as high as in region 430) and then decreases again to the index of the bulk silica that forms the cladding 470.

Figure 8:
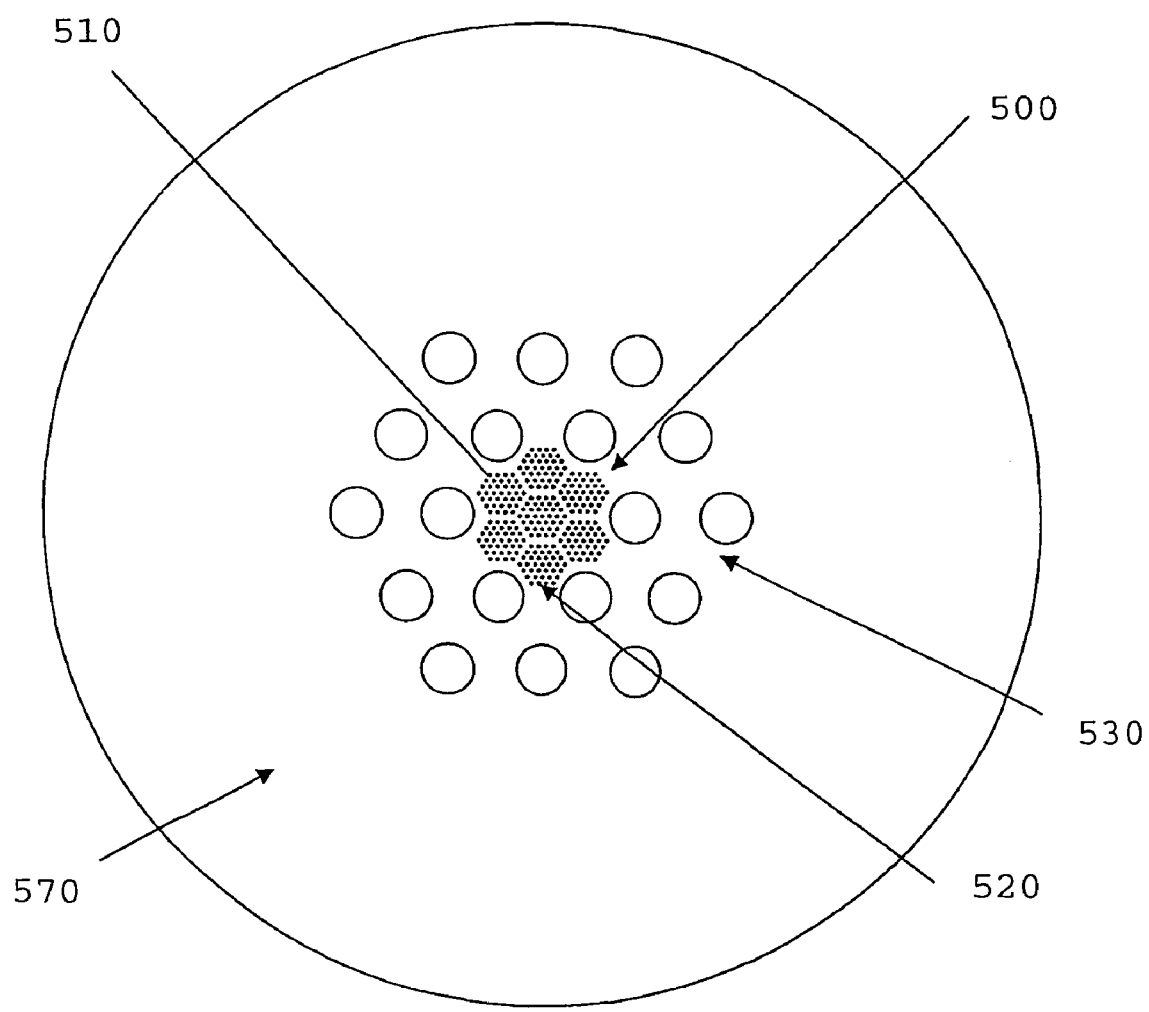
FIG. 8 is a schematic cross-section through a photonic-crystal fibre, which exhibits photosensitivity resulting from incorporation in its core of an optical material according to the invention.

The fibre of FIG. 8 is a photonic crystal fibre into which a photosensitive material has been incorporated by means of a nanostructured core 500. The core is surrounded by a photonic-crystal cladding region 530 surrounded by a jacket region 570. Cladding region 530 includes a periodic array of cylindrical holes, arranged on a triangular lattice, running through bulk silica. The jacket is bulk silica. Core 500 acts as a defect in the photonic crystal and light at certain wavelengths, which are excluded from propagation in the photonic crystal, can propagate in the defect. Core 500 comprises hexagonal regions 520, which in turn are made from cylinders 510 separated by undoped silica matrix regions. Cylinders 510 are made from silica doped with Germanium ions. Germanium-doped silica glass is photosensitive, so that the refractive index of Germanium-doped silica changes on exposure to light. Such a fibre can be used to make fibre Bragg gratings by exposure to light, for example in order to form an optical cavity within the fibre or to form a wavelength-selective filter.

Figure 9:
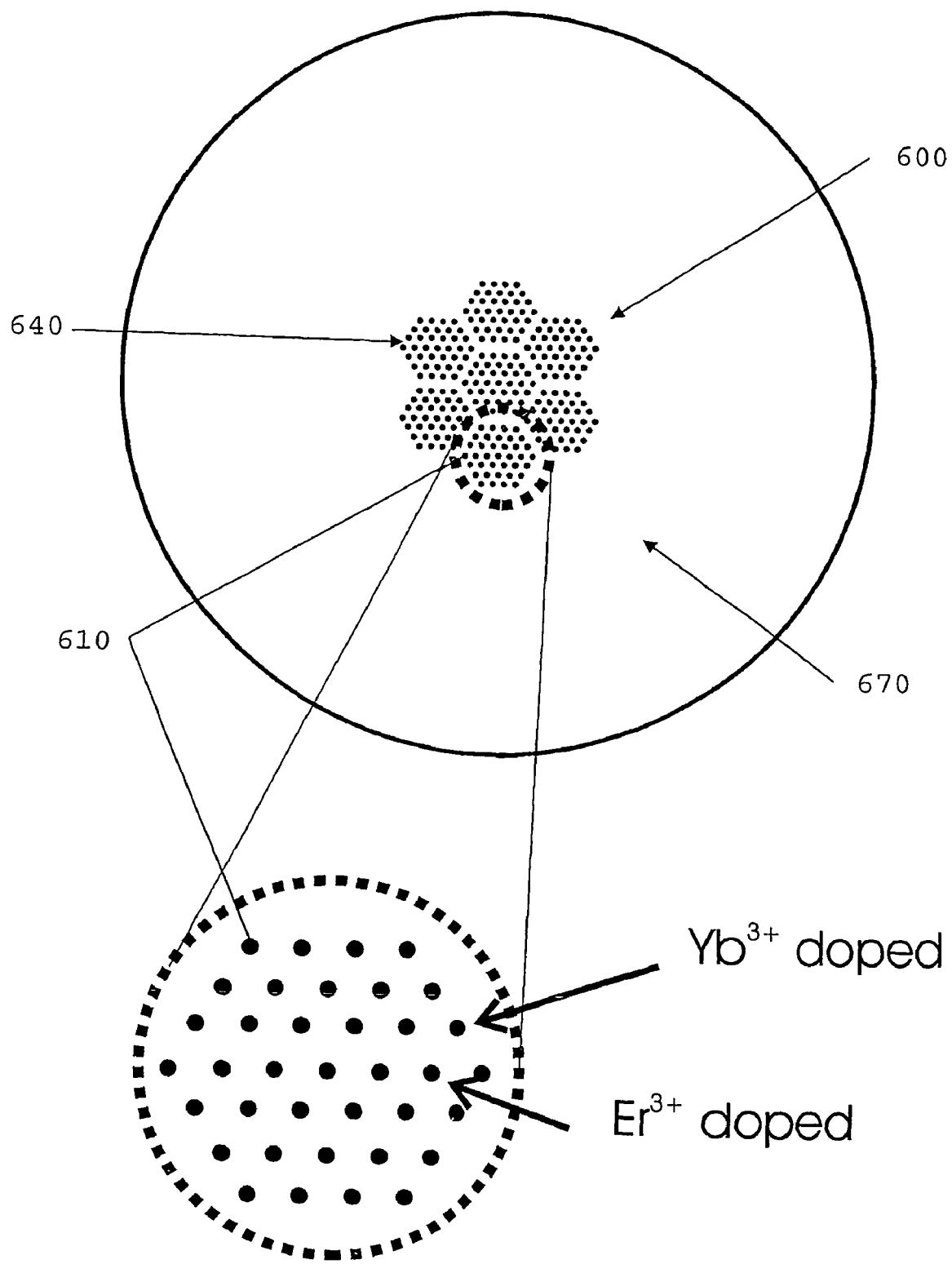
FIG. 9 is a schematic cross-section through a photonic-crystal fibre laser or amplifier, which exhibits dual-wavelength gain resulting from incorporation in its core of an optical material according to the invention.

The fibre of FIG. 9 exhibits gain over two wavelength bands centred on two independent transitions and thus has an extended gain spectrum. Such dual-wavelength operation is possible because the fibre has a nanostructured core 600 that is doped with both Ytterbium ions and Erbium ions. Ytterbium exhibits gain at a centre wavelength of around 1040 nm and Erbium exhibits gain at a centre wavelength of around 1550 nm. Core 600 is surrounded by bulk silica cladding 670 and comprises hexagonal regions 640. Each hexagonal region 640 is drawn from a bundle of rods, half of which have been doped with Ytterbium ions and half of which have been doped with Erbium ions. The dopant ions thus provide uniform gain at both lasing wavelengths across core 600. However, because cylinders 610, drawn from the doped rods, are spatially separated on a nanometer scale by bulk silica matrix material (originating in the outer, undoped part of each doped rod), energy-transfer effects between the dopant ions are reduced.

Figure 10:
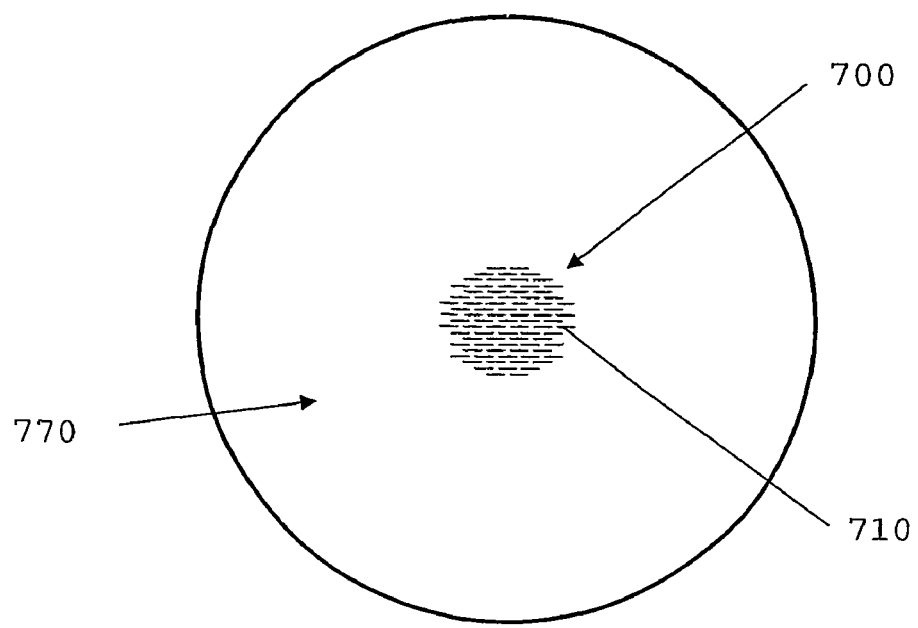
FIGS. 10 and 11 are schematic cross-sections through optical fibres, which exhibit birefringence resulting from incorporation in their core of an optical material according to the invention.
Figure 11:
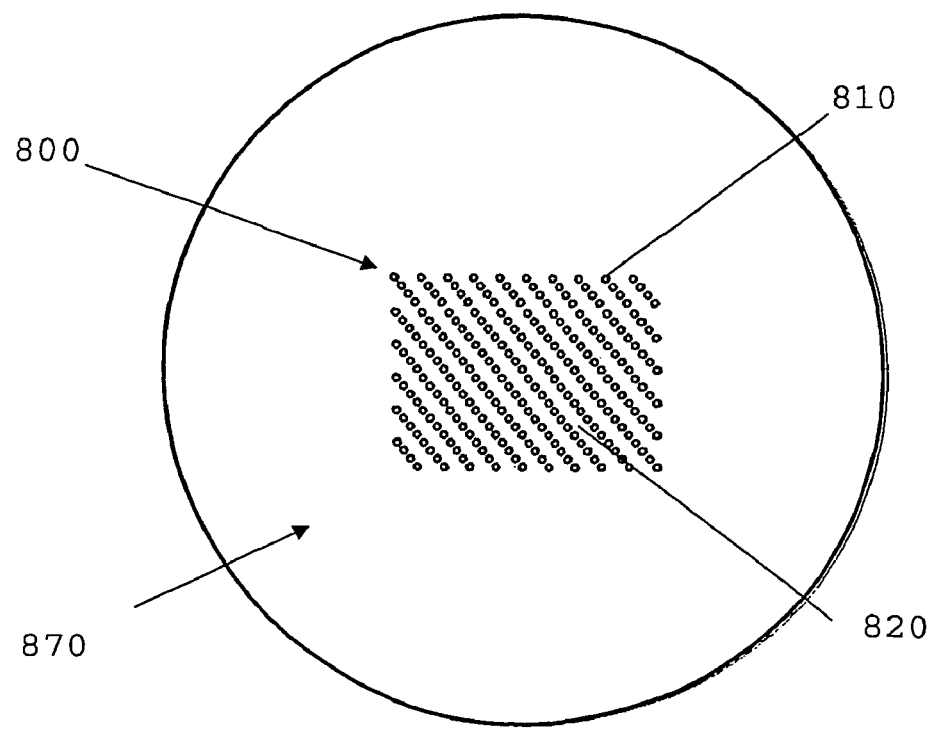

The fibres of FIGS. 10 and 11 are birefringent because of the symmetries of the nanostructuring of their cores. The fibre of FIG. 10 has a substantially circular core 700, made of many cylinders 710 of substantially elliptical cross-section, the ellipses being significantly eccentric. The core 700 is here drawn from a bundle of rods that have been flattened in one direction perpendicular to their longitudinal axis so that they have an elliptical cross-section. The two-fold rotational symmetry of each of the cylinders results in birefringence, because light polarised in a direction parallel to the major axis of each ellipse sees a different refractive index from light polarised in a direction perpendicular to that direction. However, because the cylinders have diameters smaller than the wavelength of the light that the fibre is to support, the birefringence produced may be regarded as an inherent optical property of the nanostructured material, rather than as a structure affecting the light at the scale of the fibre cross-section. The core 700 is surrounded by a cladding 770.

The fibre of FIG. 11 achieves the same result—creation of a birefringent nanostructured material—by drawing a rectangular core 800 from a bundle of rods arranged in diagonal rows. Across the cross-section of the fibre, the rows are alternately bulk silica rods and rods made from germanium-doped silica. In the fibre, the doped cores form cylinders 810, which are similarly arranged in rows, and the undoped silica forms matrix regions 820. Light polarised in a direction parallel to the rows therefore sees a different refractive index from light polarised in a direction perpendicular to that direction and so the fibre exhibits birefringence, again at the scale of the material rather than the fibre core. Cladding 870 surrounds the core 800.

Figure 12:
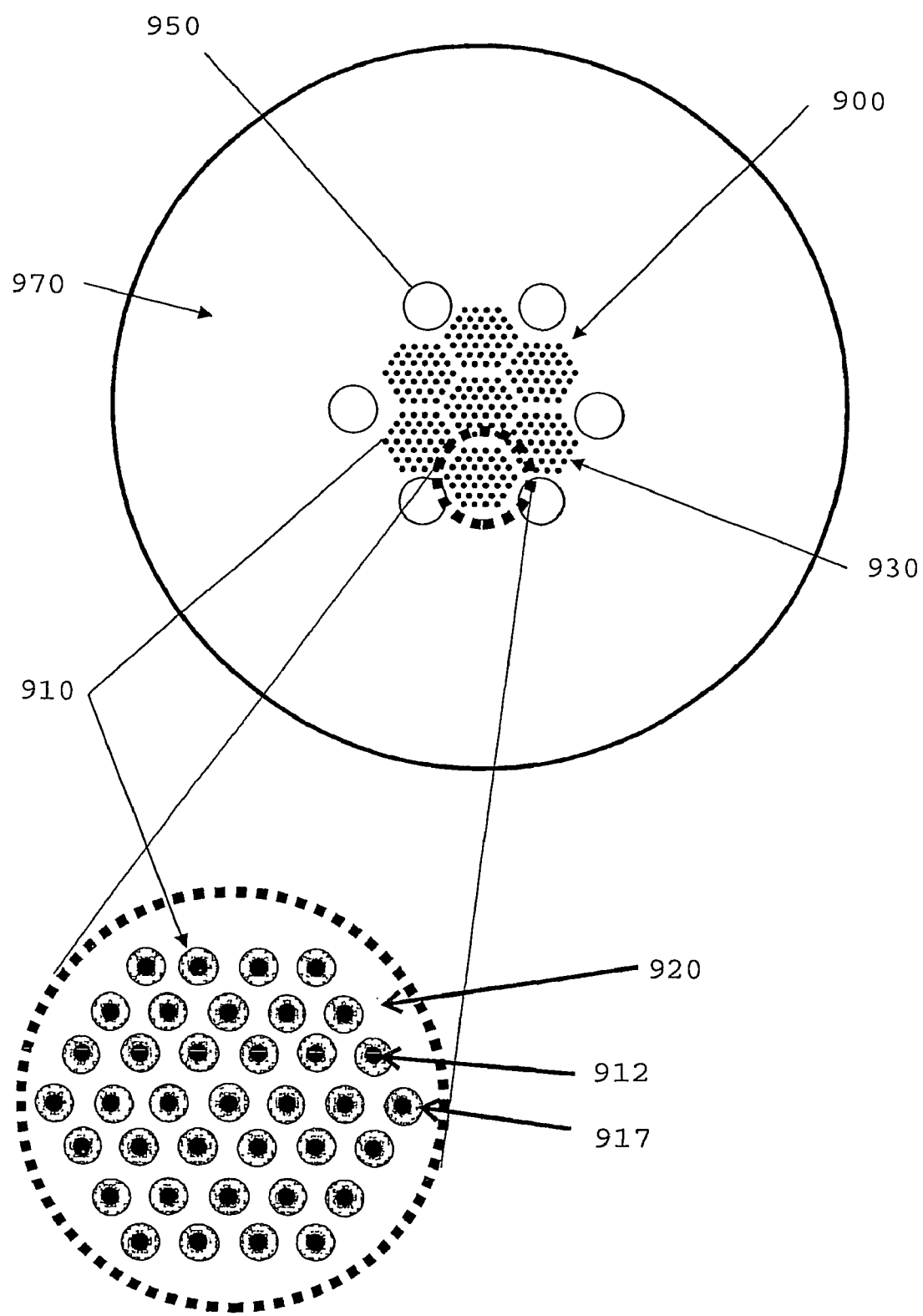
FIG. 12 is a schematic cross-section through a further photonic-crystal fibre incorporating an optical material according to the invention.

The photonic-crystal fibre of FIG. 12 comprises a core 900 surrounded by a cladding region comprising a periodic array of elongate holes 950 (not all shown), which is in turn surrounded by a jacket 970. Core 900 is formed of hexagonal regions 930, which each comprise an array of cylinders 910, which has been drawn from a bundle of rods. As is shown in the magnified portion of FIG. 12, each cylinder comprises an inner region 912 and an outer region 917 and the cylinders are, as in the other illustrated embodiments, separated by an undoped silica matrix 920. The inner regions 912 are doped with germanium so that they have a refractive index $n_{inner}^{Ge}$ that is higher than the refractive index of silicon $n_{matrix}$. The outer regions 917 have been doped with fluorine so that they have a refractive index $n_{outer}^{F}$ that is less than that of silicon. The cylinders are drawn from rods made by enclosing a germanium-doped rod in a fluorine-doped jacket. The doping levels are chosen so that, because the raised-index and depressed-index regions occur on a scale that is small compared with the wavelength of propagating light, and the absolute variation of refractive index is small, the effective refractive index of the material is approximately equal to the refractive index $n^{Si}$ of bulk silica:

$$n_{\it eff} = \frac{n_{matrix}A_{matrix} + n_{inner}^{Ge}A_{inner}^{Ge} + n_{outer}^{F}A_{outer}^{F}}{A_{matrix} + A_{inner}^{Ge} + A_{outer}^{F}} = n^{Si} \quad (4)$$

where $A_{matrix}$, $A_{inner}^{Ge}$ and $A_{outer}^{F}$ are the areas occupied by the matrix regions, the germanium-doped regions and the fluorine-doped regions, respectively. Thus, by nanostructuring, dopants may be incorporated into a material without changing the bulk refractive index of that material.

Figure 14:
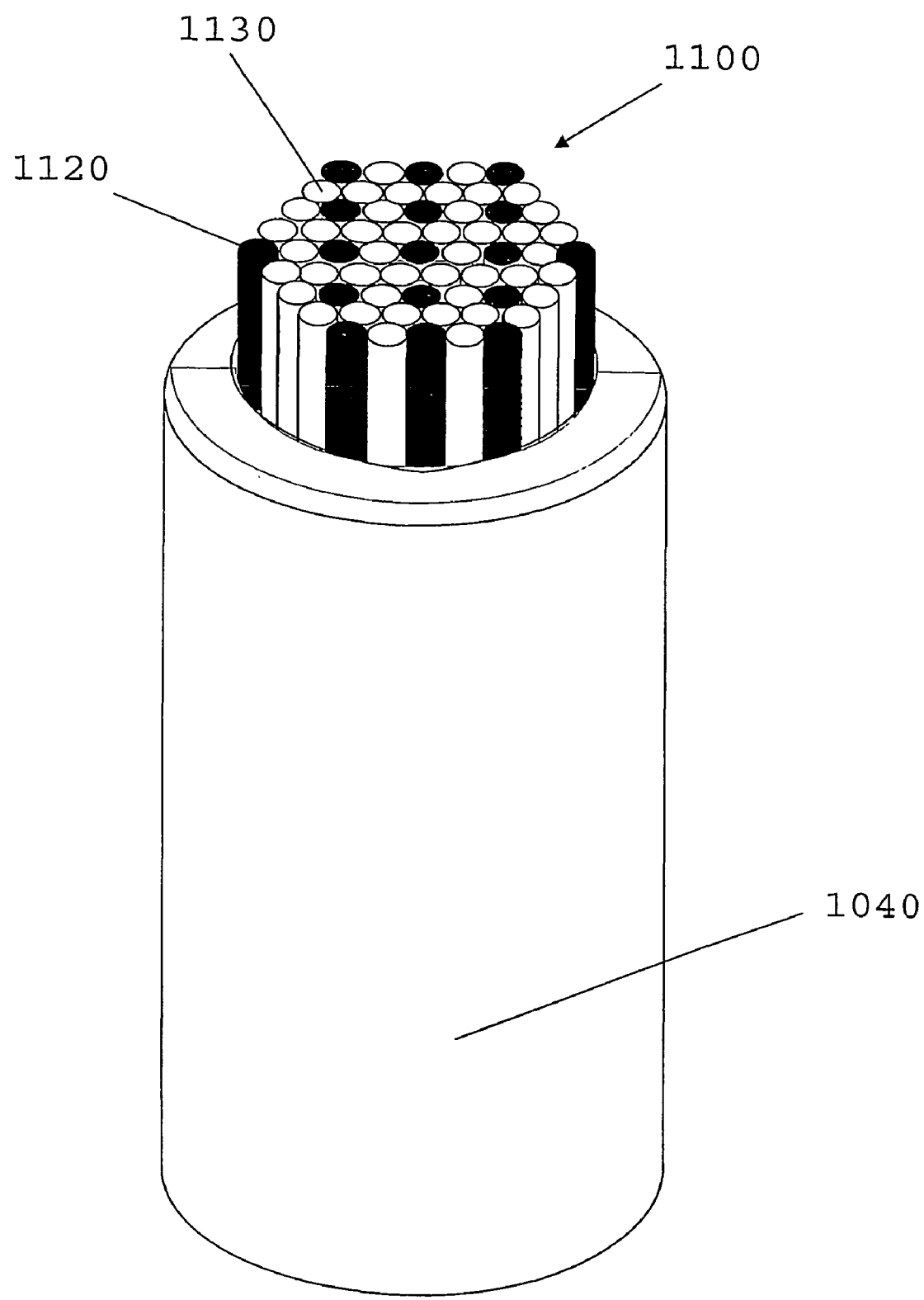
FIG. 14 is another preform for use in a multiple stack and draw method according to the invention.

Another example of a preform 1100 suitable for use in a method according to the invention is shown in FIG. 14. The preform 1100 is a bundle of rods 1120, 1130. Rods 1120 are silica doped with Erbium, whereas rods 1130 are pure silica. Doped rods 1120 are interspersed between rods 1130 such that rods 1120 are arranged on a square lattice and rods 1130 on a hexagonal lattice (rods 1120, 1130 together form a triangular lattice).

Preform 1100 is drawn into a rod that is cut into lengths which are re-bundled and redrawn until the pitch of rods 1120 is reduced sufficiently for the resulting material to appear substantially optically homogenous to light of a selected wavelength.

Figure 15:
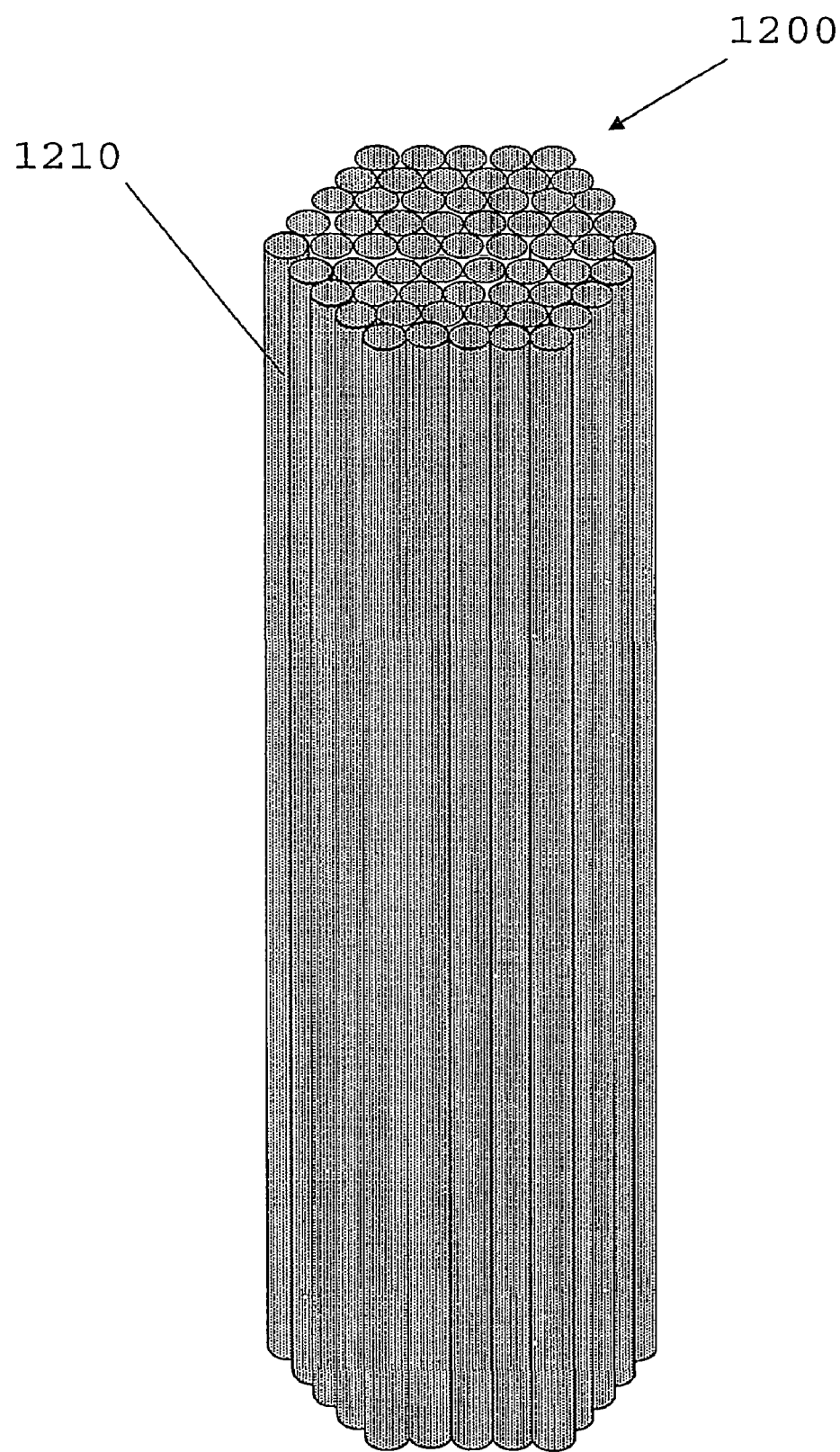
FIG. 15 is another preform for use in a multiple stack and draw method according to the invention.

Another example of a preform 1200 suitable for use in the invention is shown in FIG. 15. Preform 1200 comprises a plurality of rods 1210. Rods 1210 are doped with tin, but the doping is not perfectly homogenous across the rod. The preform 1200 is drawn, cut, re-bundled and re-drawn repeatedly until rods 1210 have been reduced to a size sufficiently small that the optical inhomogeneities in their cross-section are on a scale sufficiently small as to appear substantially homogenous to light of a selected wavelength.

The invention claimed is:

1. A composite material for supporting propagation of light of a wavelength λ, comprising a plurality of elongate regions comprising solid cylinders separated from each other by regions of a solid matrix material and defining a longitudinal axis, the composite material being arranged to support propagation of light in a direction substantially parallel to said longitudinal axis, wherein each cylinder is made from material differing from a neighbouring region of matrix material in an optical property, and each cylinder having a transverse cross-sectional area that is sufficiently small for the composite material to be substantially optically homogeneous in respect of light of wavelength λ, and wherein said regions are solid.

2. The composite material as claimed in claim 1, in which the regions comprise a dielectric material or a semiconductor.

3. The composite material as claimed in claim 1, in which the regions comprise a metal.

4. The composite material as claimed in claim 1, in which the regions are not all of the same refractive index.

5. The composite material as claimed in claim 1, in which at least some of the regions have been doped with a dopant.

6. The composite material as claimed in claim 5, in which the doping results in a change in refractive index.

7. The composite material as claimed in claim 5, in which at least some of the regions are doped with an optically active dopant.

8. The composite material as claimed in claim 7, in which the optically active dopant renders the material photosensitive.

9. The composite material as claimed in claim 8, in which the optically active dopant is germanium, boron, or tin.

10. The composite material as claimed in claim 8, in which not all of the regions are doped in the same manner, so that not all parts of the material are equally photosensitive.

11. The composite material as claimed in claim 7, in which the optically active dopant provides optical gain.

12. The composite material as claimed in claim 11, in which not all of the regions are doped with the same optically active dopant, so that gain is provided at two or more different wavelengths.

13. The composite material as claimed in claim 11 in which the optically active dopant comprises ytterbium or erbium.

14. The composite material as claimed in claim 1, having a selected effective-refractive-index profile in the plane perpendicular to the longitudinal axes.

15. The composite material as claimed in claim 14, in which the selected effective-refractive-index profile is a gradual decrease in refractive index radially from the centre of the material.

16. The composite material as claimed in claim 14, in which the selected effective-refractive-index profile defines a regular polygon.

17. The composite material as claimed in claim 14, in which the selected effective-refractive-index profile defines-a non-regular figure.

18. The composite material as claimed in claim 14, in which the selected effective-refractive-index profile defines an optically dispersive material.

19. The composite material as claimed in claim 14, in which the selected effective-refractive-index profile defines a waveguide including a core having an effective refractive index that is larger than the effective refractive index of material surrounding the core.

20. The composite material as claimed in claim 19, in which the core is larger than 10 microns in its smallest transverse dimension and the difference between the effective refractive index of the core and the effective refractive index of the material surrounding the core is sufficiently small for the waveguide to support single-mode propagation of light.

21. The composite material as claimed in claim 1, in which the material has no rotational symmetry higher than two-fold rotational symmetry about any longitudinal axis, so the composite material is birefringent.

22. The composite material as claimed in claim 21, in which the material has no rotational symmetry about any longitudinal axis.

23. The composite material as claimed in claim 21, in which the material has two-fold rotational symmetry about a longitudinal axis.

24. The composite material as claimed in claim 1, in which the diameter of the cylinders is less than 1 micron.

25. The composite material as claimed in claim 1, in which the refractive index of the cylinders is less than that of the regions of a matrix material.

26. The composite material as claimed in claim 1, in which the refractive index of the cylinders is greater than that of the regions of a matrix material.

27. The composite material as claimed in claim 1, in which the cylinders comprise an inner region having a first refractive index and an outer region having a second refractive index and surrounding the inner region so that the refractive index of the cylinder is an effective refractive index that is between the first and the second refractive indices.

28. The composite material as claimed in claim 27, in which the effective refractive index is equal to the refractive index of the matrix regions.

29. The composite material as claimed in claim 1, in which the cylinders are distributed in the matrix material at different densities in different parts of the material.

30. The composite material as claimed in claim 1, in which the regions of a matrix material are not all of the same material.

31. The composite material as claimed in claim 1, in which the cylinders are not all identical to each other.

32. The composite material as claimed in claim 31, in which the cylinders are not all of the same shape.

33. The composite material as claimed in claim 31, in which the cylinders are not all of the same size.

34. The composite material as claimed in claim 31, in which the cylinders are not all of the same material.

35. The composite material as claimed in claim 1, in which at least some of the cylinders or regions of matrix material have been doped with a dopant.

36. The composite material as claimed in claim 1, which exhibits birefringence due to mechanical stresses between the cylinders and regions of a matrix material.

37. The composite material as claimed in claim 1, that exhibits its birefringence resulting at least partly from the distribution of the cylinders.

38. The composite material as claimed in claim 1, that exhibits birefringence resulting at least partly from the shape of the cylinders.

39. The composite material as claimed in claim 1, in which the cylinders are of circular cross-section.

40. The optical amplifier as claimed in claim 1, which is a large-mode-area amplifier.

41. The laser including an optical amplifier as claimed in claim 1.

42. A method of providing a selected optical property in a composite material for supporting propagation of light of a wavelength $\lambda$ comprising:
  (i) providing a plurality of rods each having a longitudinal axis;
  (ii) forming a bundle of the rods, in which the rods have their longitudinal axes substantially parallel to each other,
  (iii) drawing an elongate, fused rod from the bundle; cutting the fused rod into a plurality of lengths; and
  (iv) repeating steps (ii) and (iii) at least once by forming the bundle from the lengths of fused rod and drawing a further, elongate fused rod from the bundles,
  wherein steps (i)–(iv) are arranged to provide that the further, elongate fused rod produced at the end of step (iv) comprises a plurality of elongate regions comprising solid cylinders each having a longitudinal axis, the cylinders being separated from each other by regions of a solid matrix material and the cylinders having their longitudinal axes substantially parallel to each other, wherein each cylinder is made from material differing from a neighbouring region of matrix material in an optical property, and each cylinder having a transverse cross-sectional area that is sufficiently small for the composite material to be substantially optically homogeneous in respect of light of wavelength $\lambda$, and wherein said regions are solid.

43. The method as claimed in claim 42, in which the rods used in step (i) have an inner region of a first solid material and an outer region of a second solid material and surrounding the inner region and the inner regions of those rods form the plurality of solid cylinders.

44. The method as claimed in claim 43, in which in at least some of the rods the inner region has a first refractive index and the outer region has a second, different refractive index.

45. The method as claimed in claim 42, in which the differing rods differ in refractive index.

46. The method as claimed in claim 42, in which the rods are doped with a dopant that is not evenly distributed across the cross-section of the rod.

47. The method as claimed in claim 42, in which the bundle of rods is enclosed in a jacket in step (ii).

48. A method of manufacturing an optical fibre, including the step of drawing an optical fibre from a preform comprising at least one rod manufactured by the method according to claim 42.

49. The method as claimed in claim 48, including the step of enclosing the preform in a jacket prior to drawing the fibre.

50. An optical fibre comprising the composite material according to claim 1.

51. The optical fibre as claimed in claim 50 and being a photonic crystal fibre.

52. A fibre amplifier comprising the optical fibre according to claim 50.

53. A fibre laser comprising the fibre amplifier according to claim 52.

54. A method of transmitting light in the composite material according to claim 1.

55. The optical fibre as claimed in claim 50 having a core region comprising said composite material.

56. The optical fibre as claimed in claim 50, wherein the composite material is in a core region of the optical fibre.

57. An optical amplifier comprising the composite material according to claim 1.

58. The composite material as claimed in claim 5, wherein the doped regions are cylindrical and have a diameter of less than 250 nm.

59. The composite material as claimed in claim 5, wherein a ratio of the diameter of the cylindrical doped regions to the wavelength $\lambda$ of the light propagated by the composite material is smaller than or equal to 0.24.

60. The composite material as claimed in claim 5, wherein the cylindrical doped regions have an area filling fraction in the cross-section of the composite material perpendicular to the longitudinal axis that is small enough for the resulting effective refractive index-step to be insufficient for guidance of light within the cylindrical doped regions.

61. The composite material as claimed in claim 60, wherein the area filling fraction of the cylindrical doped region is a few percent.

* * * * *